(12) United States Patent
Stanko et al.

(10) Patent No.: US 8,930,770 B2
(45) Date of Patent: Jan. 6, 2015

(54) MONITORING THE HEALTH OF DISTRIBUTED SYSTEMS

(71) Applicant: Microsoft Corporation, Redmond, WA (US)

(72) Inventors: Igor Stanko, Laguna Niguel, CA (US); Matthew K. Peebles, Laguna Niguel, CA (US); Namyong Lee, Tustin, CA (US); Artem D. Yegorov, Aliso Viejo, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 14/066,229

(22) Filed: Oct. 29, 2013

(65) Prior Publication Data

US 2014/0156832 A1    Jun. 5, 2014

Related U.S. Application Data

(63) Continuation of application No. 13/100,913, filed on May 4, 2011, now Pat. No. 8,572,439.

(51) Int. Cl.
*G06F 11/30* (2006.01)
*H04L 12/26* (2006.01)
*G06F 11/07* (2006.01)
*H04L 12/24* (2006.01)

(52) U.S. Cl.
CPC ........ *G06F 11/3006* (2013.01); *H04L 43/0817* (2013.01); *G06F 11/0709* (2013.01); *G06F 11/0781* (2013.01); *G06F 11/0784* (2013.01); *H04L 41/046* (2013.01); *H04L 41/065* (2013.01)
USPC .......................................................... 714/39

(58) Field of Classification Search
None
See application file for complete search history.

(56) References Cited

U.S. PATENT DOCUMENTS

| | | | |
|---|---|---|---|
| 5,961,596 A * | 10/1999 | Takubo et al. ................ 709/224 |
| 6,470,385 B1 * | 10/2002 | Nakashima et al. .......... 709/224 |
| 7,469,239 B2 | 12/2008 | Musman |
| 7,636,708 B2 * | 12/2009 | Garcea et al. ........................ 1/1 |
| 7,698,239 B2 * | 4/2010 | Lieuallen et al. ............... 706/16 |
| 7,792,922 B2 * | 9/2010 | Purcell et al. ................ 709/217 |
| 7,849,368 B2 * | 12/2010 | Srivastava et al. ........... 714/47.1 |
| 7,860,682 B2 * | 12/2010 | Hamilton et al. ............. 702/183 |
| 8,572,439 B2 | 10/2013 | Stanko et al. |
| 2003/0036886 A1 * | 2/2003 | Stone ............................ 702/188 |
| 2003/0191989 A1 * | 10/2003 | O'Sullivan ...................... 714/47 |
| 2010/0063855 A1 | 3/2010 | Nguyen |
| 2010/0306588 A1 * | 12/2010 | Hamilton et al. ............... 714/26 |
| 2012/0284571 A1 | 11/2012 | Stanko et al. |

OTHER PUBLICATIONS

Bohdanowicz, Jean-Eric et al., "The Problematic of Distributed Systems Supervision—An Example: Genesys", 2004, 36 pages. (The month of Publication is irrelevant since the year of Publication is clearly prior to the filing of the Application).

(Continued)

*Primary Examiner* — Nadeem Iqbal
(74) *Attorney, Agent, or Firm* — Nicholas Chen; David Andrews; Micky Minhas

(57) ABSTRACT

The present invention extends to methods, systems, and computer program products for monitoring the health of distributed systems. Embodiments of the invention provide distributed, self-maintained, continuous health monitoring. Using XML and pluggable infrastructure, a logical view of an appliance can be provided. The logical view abstracts physical implementation details of the appliance. Monitoring agents can correlate different distributed system failures and events and reason over collected health information.

20 Claims, 6 Drawing Sheets

(56) References Cited

OTHER PUBLICATIONS

Calisti, Monique, "Abstracting Communication in Distributed Agent-Based Systems", Jun. 2002, 8 pages.

Das, Oliva, et al., "Modeling the Coverage and Effectiveness of Fault-Management Architectures in Layered Distributed Systems", Proceedings of the International Conference on Dependable Systems and Networks (DSN'02), Jun. 2002, 10 pages.

Mehta, Ashish Kumar, "Identify Missing Indexes Using SQL Server DMVs", Jan. 11, 2009, 6 pages.

Notice of Allowance dated Jun. 25, 2013 cited in U.S. Appl. No. 13/100,913 (Copy Attached).

* cited by examiner

MONITORING THE HEALTH OF DISTRIBUTED SYSTEMS

CROSS-REFERENCE TO RELATED APPLICATIONS

This application is a continuation of U.S. patent application Ser. No. 13/100,913, filed on May 4, 2011 and entitled "MONITORING THE HEALTH OF DISTRIBUTED SYSTEMS," which issued as U.S. Pat. No. 8,572,439 on Oct. 29, 2013, which application is expressly incorporated herein by reference in its entirety.

BACKGROUND OF THE INVENTION

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing environments.

In some computing environments, a number of nodes are deployed, such as, for example, within an organization or in a "cloud", to provide a software service or appliance. Different portions of appliance functionality can then be implemented at different nodes. Collectively, the different portions of appliance functionality represent the overall functionality of the appliance.

Health monitoring techniques can be used to monitor health information for each individual node of an appliance. The health information for each node can be reported to a user. That is, a user can be provided with raw health information for individual nodes.

However, there is typically no automated mechanism for aggregating and/or reasoning over health information from a number of different nodes. Thus, there is limited, if any, mechanisms for providing an overall health view of an appliance or for providing a user with guidance related to overall appliance functionality. As such, a user is burdened with analyzing health information from multiple to different nodes in an effort to understand the overall health of and identify potential problems with the appliance. As the number of nodes used to implement an appliance increases, a user's ability to understand and make decisions based on health information from individual nodes becomes corresponding more difficult.

BRIEF SUMMARY

The present invention extends to methods, systems, and computer program products for monitoring the health of distributed systems. In some embodiments, a computer system, within a plurality of computer systems, is configured to monitor a portion of an appliance implemented in a distributed system. The computer system accesses an appliance definition file. The appliance definition file defines a plurality of different node types of that are to be integrated together to implement the appliance.

The computer system selects a node type, from among the plurality of different node types of nodes, to implement. The computer system reads a portion of the appliance definition file defining functionality for the selected node type. The computer system implements the selected node type in accordance with the defined functionality.

The computer system reads a health file that identifies components that are to be monitored for the selected node type. The computer system loads a monitor agent at the computer system to monitor the identified components. The computer system collects health information indicating the health of the identified components. The computer system transfers the collected health information to a repository. The repository aggregates collected health information for identified components within the plurality of computer systems. Accordingly, the aggregated health data can be used to provide a logical health view of the appliance. The logical health view is abstracted from the identified components within the plurality of computer systems.

In other embodiments, a computer system monitors an appliance implemented within a distributed system. The computer system reads a portion of an appliance definition file defining functionality for a control node. The appliance definition file defines a plurality of different types of nodes, including the control node. The functionality of the plurality of different types of nodes is integrated together to implement the appliance.

The computer system implements the control node at the computer system in accordance with the defined functionality. The control node is configured to access a repository for aggregating collected health information received from health monitoring agents at other nodes providing appliance functionality. Health information is collected at other nodes in accordance with health files that identify specified components that are to be monitored.

The computer system receives collected health information from monitoring agents at a plurality of other nodes in the distributed system. The received health information is related to monitored components at each of the plurality of other nodes. The computer system aggregates the collected health information in the repository. The computer system reasons reasoning over the aggregated health information in the repository to formulate a logical health view for the appliance. The logical health view abstracts the physical implementation of the appliance. Reasoning over the aggregated health information includes correlating collected health information from at least two different nodes to generate a condition of interest with respect to operation of the appliance.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
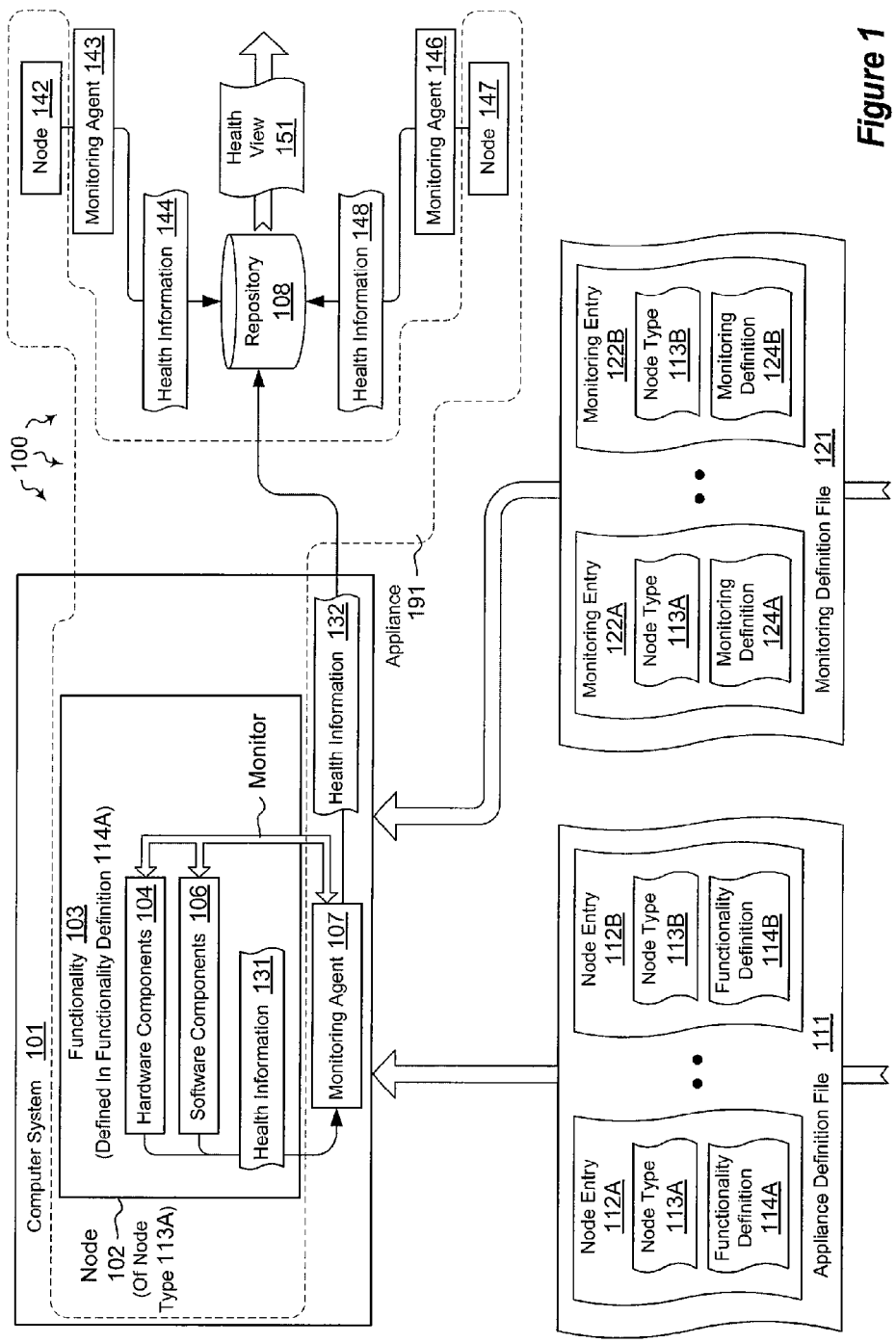
FIG. 1 illustrates an example computer architecture that facilitates configuring a computer system to monitor a portion of an appliance implemented at a distributed system.

The present invention extends to methods, systems, and computer program products for monitoring the health of distributed systems. In some embodiments, a computer system, within a plurality of computer systems, is configured to monitor a portion of an appliance implemented in a distributed system. The computer system accesses an appliance definition file. The appliance definition file defines a plurality of different node types of that are to be integrated together to implement the appliance.

The computer system selects a node type, from among the plurality of different node types of nodes, to implement. The computer system reads a portion of the appliance definition file defining functionality for the selected node type. The computer system implements the selected node type in accordance with the defined functionality.

The computer system reads a health file that identifies components that are to be monitored for the selected node type. The computer system loads a monitor agent at the computer system to monitor the identified components. The computer system collects health information indicating the health of the identified components. The computer system transfers the collected health information to a repository. The repository aggregates collected health information for identified components within the plurality of computer systems. Accordingly, the aggregated health data can be used to provide a logical health view of the appliance. The logical health view is abstracted from the identified components within the plurality of computer systems.

In other embodiments, a computer system monitors an appliance implemented within a distributed system. The computer system reads a portion of an appliance definition file defining functionality for a control node. The appliance definition file defines a plurality of different types of nodes, including the control node. The functionality of the plurality of different types of nodes is integrated together to implement the appliance.

The computer system implements the control node at the computer system in accordance with the defined functionality. The control node is configured to access a repository for aggregating collected health information received from health monitoring agents at other nodes providing appliance functionality. Health information is collected at other nodes in accordance with health files that identify specified components that are to be monitored.

The computer system receives collected health information from monitoring agents at a plurality of other nodes in the distributed system. The received health information is related to monitored components at each of the plurality of other nodes. The computer system aggregates the collected health information in the repository. The computer system reasons reasoning over the aggregated health information in the repository to formulate a logical health view for the appliance. The logical health view abstracts the physical implementation of the appliance. Reasoning over the aggregated health information includes correlating collected health information from at least two different nodes to generate a condition of interest with respect to operation of the appliance.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Generally, embodiments of the invention are used to monitor distributed systems. Health information for various different nodes of an appliance can be collected and stored. The health information for various different nodes can be aggregated to present the health of the appliance as a single view/unit. Collection, storage, and presentation of health information is customizable and can provide abstraction from distributed system complexity.

Distributed health monitoring can include deploying a health monitoring agent at each node that implements a portion of appliance functionality. Health monitoring agent responsibility can include orchestrating different processes, collecting the health of distributed system components, (e.g. CPU clock speed, CPU failures, power supply failures, node temperature, connection status, storage availability), collecting the health of different software components deployed on the distributed system (e.g. health of cluster, failovers), and persisting collected information into (e.g., permanent) data stores. Health monitoring agents can be fully autonomous and distributed within an appliance. Health monitoring agents can be configured to automatically awakening on a predefined time intervals to collect and persist system wide health information. In addition, health monitoring agents can be configured to correlate and reason over different events to discover system level failures, such as, for example, failover situations, disk array failures, CPU failures, etc.

FIG. 1 illustrates an example computer architecture 100 that facilitates configuring a computer system to monitor a portion of an appliance implemented at a distributed system. Referring to FIG. 1, computer architecture 100 includes computer system 101, repository 108, nodes 142 and 147 and monitoring agents 143 and 146. Each of the depicted computer systems and components can be connected to one another over (or is part of) a network, such as, for example, a Storage Area Network ("SAN"), a Local Area Network ("LAN"), a Wide Area Network ("WAN"), and even the Internet. Accordingly, each of the depicted computer systems as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

Within computer architecture 100, nodes 102, 142, and 147 can each provide a portion of the functionality of appliance 191 (e.g., a storage appliance). As such, the functionality appliance 191 is distributed at least across nodes 102, 142, and 147. In some embodiments, appliance 191 is a storage appliance including hardware components and software components for storing data.

As depicted, computer system 101 includes node 102 and monitoring agent 107. At node 102, hardware components 104 (e.g., processors, storage devices, memory, NICs, power supplies, etc.) and software components 106 can used to implement functionality 103. Functionality 103 can be a portion of the functionality for appliance 191.

Generally, repository 108 is configured to receive health information from monitoring agents, such as, for example, monitoring agents 107, 143, and 146, that are monitoring a plurality of different nodes, such as, for example, nodes 102, 142, and 147 respectively. Health information stored at repository 108 can be aggregated to provide a single logical health view of appliance 191.

Appliance definition file 111 includes a plurality of node entries including node entries 112A and 112B. Each node entry corresponds to a specified node type (e.g., control node, management node, computer node, backup node, landing zone node, etc.) that provides a portion of appliance functionality for appliance 191. Each node entry also includes a functionality definition defining how the corresponding node type is to be implemented to provide the portion of application functionality for appliance 191. For example, node entries 112A and 112B include node types 113A and 113B and functionality definitions 114A and 114B respectively. A computer system (e.g., computer system 101) can access appliance definition file 111 and implement functionality for a specified node type in accordance with a functionality definition for the specified node type.

Monitoring definition file 121 includes a plurality of monitoring entries including monitoring entries 122A and 122B. Each monitoring entry also corresponds to a specified node type (e.g., control node, management node, computer node, backup node, landing zone node, etc) that provides a portion of appliance functionality. Each monitoring entry also includes a monitoring definition defining how a monitoring agent is to monitor the corresponding node type. For example, monitoring entries 122A and 122B include node types 113A and 113B and monitoring definitions 124A and 124B respectively. A computer system (e.g., computer system 101) can access monitoring definition file 121 and implement a monitoring agent to monitor health information for a specified node type in accordance with a monitoring definition for the specified node type.

Figure 2:
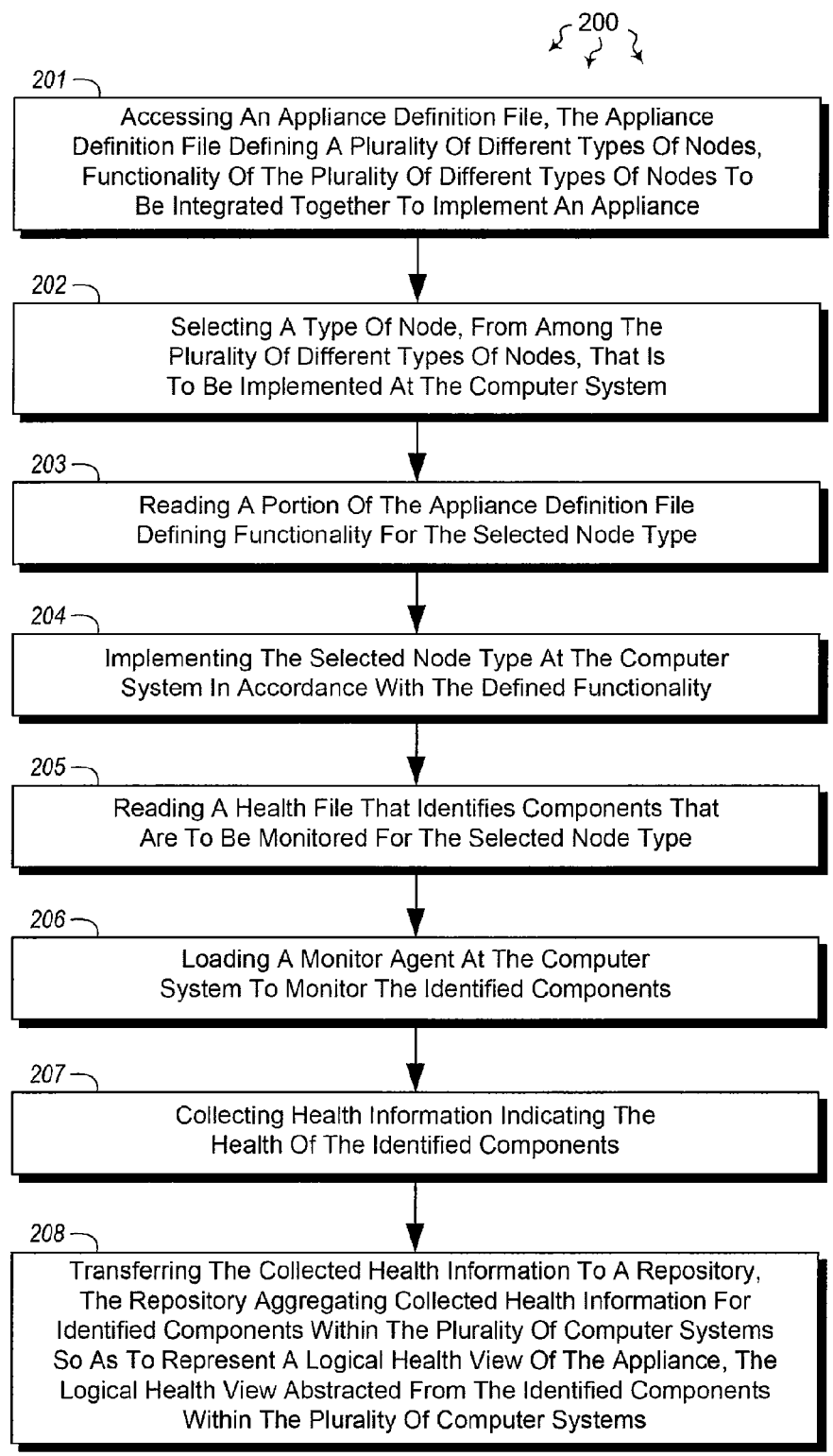
FIG. 2 illustrates a flow chart of an example method for configuring a computer system to monitor a portion of an appliance implemented at a distributed system.

FIG. 2 illustrates a flow chart of an example method 200 for configuring a computer system to monitor a portion of an appliance implemented at a distributed system. Method 200 will be described with respect to the components and data of computer architecture 100.

Method 200 includes an act of accessing an appliance definition file, the appliance definition file defining a plurality of different types of nodes, functionality of the plurality of different types of nodes to be integrated together to implement an appliance (act 201). For example, computer system 101 can access appliance definition file 111. Through various node entries 112A, 112B, etc., appliance definition file can define functionality for a plurality of different node types, such as, for example, control node, management node, computer node, backup node, landing zone node, etc. The functionality of the plurality of different node types indicated in appliance definition file 111 can be integrated together to implement appliance 191.

Method 200 includes an act of selecting a type of node, from among the plurality of different types of nodes, that is to be implemented at the computer system (act 202). For example, computer system 101 can select node type 113A to be implemented at computer system 101. Method 200 includes an act of reading a portion of the appliance definition file defining functionality for the selected node type (act 203). For example, computer system 101 can read functionality definition 114A, which defines the functionality of node type 113A.

Method 200 includes an act of implementing the selected node type at the computer system in accordance with the defined functionality (act 204). For example, computer system 101 can implement node 102 (of node type 113A). Node 102 can provide functionality 103 in accordance with functionality definition 114A. Functionality definition 114A can define that hardware components 104 and software components 106 are to be used to provide functionality 103.

Functionality of nodes 142 and 147 can also be implemented in accordance with appropriate node entries of appliance definition file 111. Appropriate functionality definitions can define hardware and software components used to implement the functionalities.

Method 200 includes an act of reading a health file that identifies components that are to be monitored for the selected node type (act 205). For example, computer system 101 can read monitoring definition file 121. Within monitoring definition file 121, monitoring entry 122A identifies components that are to be monitored for nodes of node type 113A. Based on node 102 being of node type 113A, computer system 101 can refer to monitoring definition 124A to identity that hardware components 104 and software components 106 to be monitored.

Method 200 includes an act of loading a monitor agent at the computer system to monitor the identified components (act 206). For example, computer system 101 can load monitoring agent 107 to monitor hardware components 104 and software components 106. Method 200 includes an act collecting health information indicating the health of the identified components (act 207). For example, monitoring agent 107 can collect health information 131 for hardware components 104 and software components 106. As such, health information 131 indicates the health of node 102.

Method 200 includes an act of transferring the collected health information to a repository, the repository aggregating collected health information for identified components within the plurality of computer systems so as to represent a logical health view of the appliance, the logical health view abstracted from the identified components within the plurality of computer systems (act 208). For example, monitoring agent 107 can transfer health information 132 (e.g., including at least health information 131) to repository 108.

Additionally, monitoring agents 143 and 146 can monitor hardware and/or software components of nodes 142 and 147 (as defined in appropriate monitoring entries) and collect health information 144 and 148 respectively. Monitoring agents 143 and 146 can transfer health information 144 and 148 respectively to repository 108. Repository 108 can aggregate health information 132 with health information 144 and health information 148. Health view 151 (a logical health view for appliance 191) can be represented from the aggregated health information. Health view 151 can be abstracted from identified components, such as, for example, hardware components 104 and software components 106, used to implement appliance 191.

Figure 3:
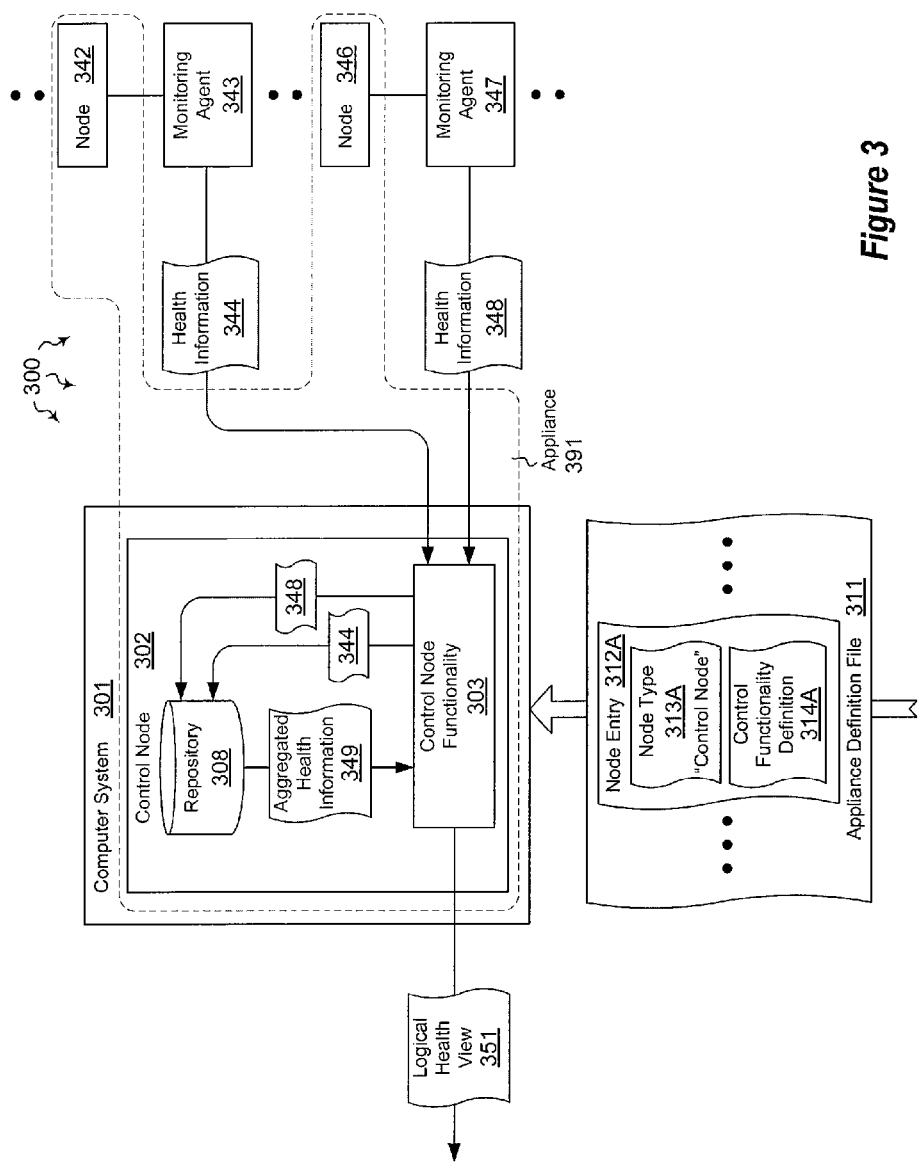
FIG. 3 illustrates an example computer architecture that facilitates monitoring an appliance implemented at a distributed system.

FIG. 3 illustrates an example computer architecture 300 that facilitates monitoring an appliance implemented at a distributed system. Referring to FIG. 3, computer architecture 300 includes computer system 301, nodes 342 and 347 and monitoring agents 343 and 346. Each of the depicted computer systems and components can be connected to one another over (or is part of) a network, such as, for example, a Local Area Network ("LAN"), a Wide Area Network ("WAN"), and even the Internet. Accordingly, each of the depicted computer systems as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

Within computer architecture 300, nodes 302, 342, and 346 can each provide a portion of the functionality of appliance 391 (e.g., a storage appliance). As such, the functionality of appliance 391 is distributed at least across nodes 302, 342, and 346. In some embodiments, appliance 391 is a storage appliance including hardware components and software components for storing data.

As depicted, computer system 301 includes node 302, which further includes control node functionality 303 and repository 308. Control node functionality 103 can be a portion of the functionality for appliance 391. Generally, repository 308 is configured to receive health information from monitoring agents, such as, for example, monitoring agents 343 and 347, that are monitoring a plurality of different nodes, such as, for example, nodes 342 and 346 respectively. Health information stored at repository 308 can be aggregated to provide a single logical health view of appliance 391. When appropriate, computer system 301 can also include a monitoring agent (not shown) to monitor and collect health information for control node 302. Health information collected for control node 302 can also be stored at repository 308.

Appliance definition file 311 includes a plurality of node entries including node entry 312A. Node entry 312 corresponds to a control node type that provides control node functionality for appliance 391. A computer system (e.g., computer system 301) can access appliance definition file 311 and implement functionality for node type 313A (a control node) in accordance with control functionality definition 314A.

Monitoring agents, such as, for example, 343 and 347, can monitor node functionality, such as, for example, at nodes 342 and 346, in accordance with appropriate monitoring entries in a monitoring definition file.

Figure 4:
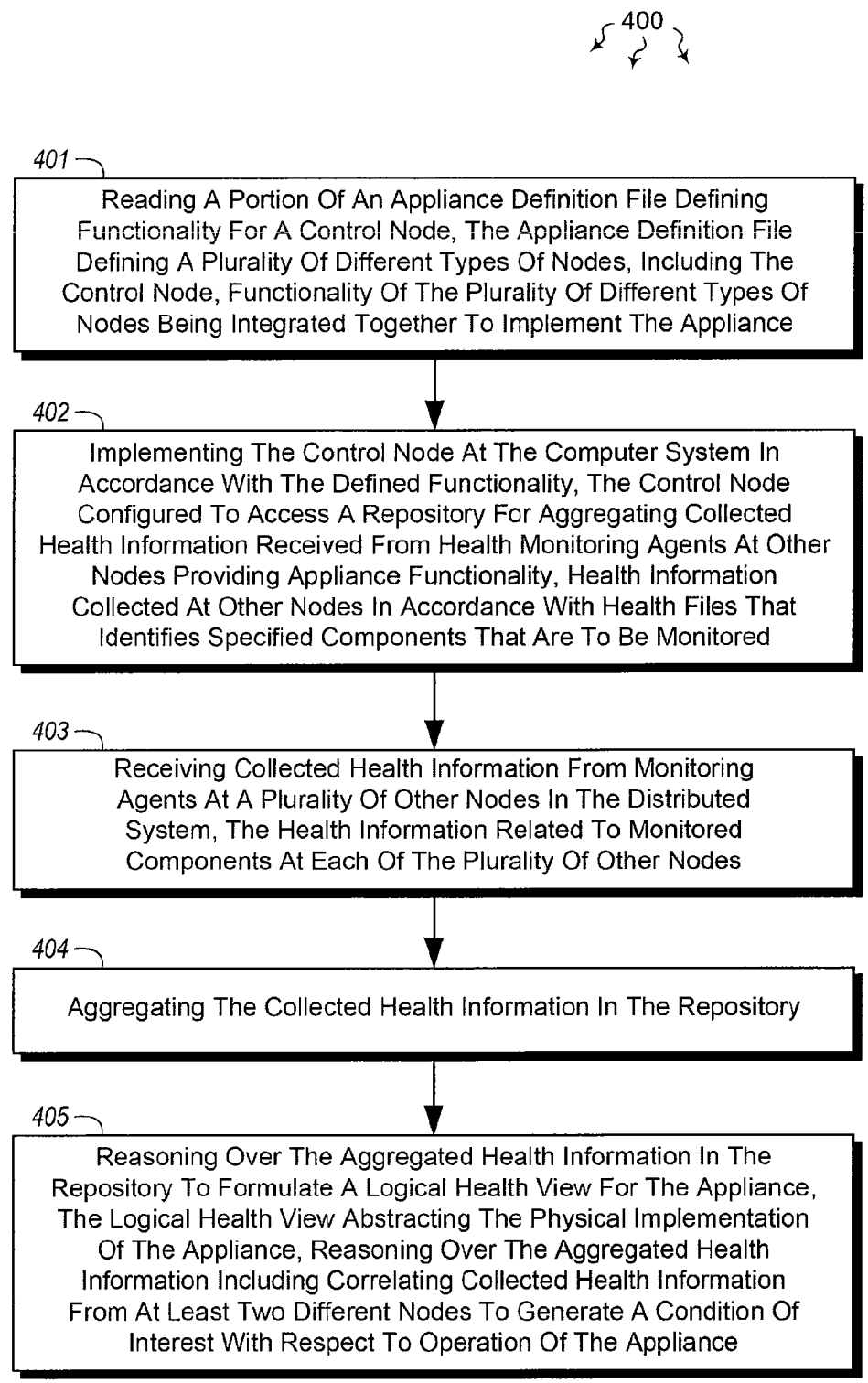
FIG. 4 illustrates a flow chart of an example method for monitoring an appliance implemented at a distributed system.

FIG. 4 illustrates a flow chart of an example method 400 for monitoring an appliance implemented at a distributed system. Method 400 will be described with respect to the components and data of computer architecture 200.

Method 400 includes an act of reading a portion of an appliance definition file defining functionality for a control node, the appliance definition file defining a plurality of different types of nodes, including the control node, functionality of the plurality of different types of nodes being integrated together to implement the appliance (act 401). For example, computer system 301 can read control functionality definition 314A from appliance definition file 311.

Method 400 includes an act of implementing the control node at the computer system in accordance with the defined functionality, the control node including a repository for aggregating collected health information received from health monitoring agents at other nodes providing appliance functionality, health information being collected at other nodes in accordance with health files that identify specified components that are to be monitored (act 402). For example, computer system 301 can implement control node 302 in accordance with control functionality definition 314A. Control node 302 can provide control node functionality 303 and include repository 308. Repository 308 can be configured to aggregate health information collected at other nodes providing other portions of functionality for appliance 391.

Method 400 includes an act of receiving collected health information from monitoring agents at a plurality of other nodes in the distributed system, the health information related to monitored components at each of the plurality of other nodes (act 403). For example, control node 302 can receive health information 344 and 348 from monitoring agents 343 and 347 respectively. Health information 344 and 348 related to monitored hardware and/or software components at nodes 342 and 347 respectively. Method 400 includes an act of aggregating the collected health information in the repository (act 404). For example, control node functionality can aggregate health information 344 and 348 in repository 303.

Method 400 includes an act of reasoning over the aggregated health information in the repository to formulate a logical health view for the appliance, the logical health view abstracting the physical implementation of the appliance, reasoning over the aggregated health information including correlating collected health information from at least two different nodes to generate a condition of interest with respect to operation of the appliance (act 405). For example, control node functionality 303 can access aggregated health information 349 from repository. Aggregated health information 349 can include health information 344 and 348 as well as health information for any other nodes (not shown) that implement a portion of functionality for appliance 391.

Control functionality 303 can reason over aggregated health information 349 to formulate a logical health view for appliance 391. Logical health view 391 can abstract the physical implementation of appliance 391. Reasoning over aggregated health information 349 can include correlating at least health information 344 and 348 into a condition of interest with respect to operation of appliance 391. For example, loss of connection to one node coupled within increased CPU utilization on another node can indicate a failover. The failover can be represented in logical health view. Representing the failover in the logical health view alleviates a user from having to derive that the failover occurred based on the loss of connection and increased CPU utilization.

Accordingly, in some embodiments, distributed health monitoring includes of a set of health agents installed/deployed on every node within an appliance. Each health agent functions completely independent of each other and have their own set of appliance components that they monitor resulting in increased parallelism. During system configuration, one monitoring agent in an appliance (e.g., a monitoring agent deployed at a control node) is designated as master monitoring agent. The master monitoring agent is responsible for monitoring all other monitoring agents in the system (e.g., using an agent heartbeat). When a monitoring agent starts malfunctioning for any reason, the master monitoring agent is capable of discovering the malfunction and can send failure alerts/notifications.

Monitoring agents can be self-maintained and can contain built-in auto-restart policy. Monitoring agents can also be configured to recover from failures automatically, while delivering continuous and uninterrupted system monitoring. Monitoring agents can monitor system health based on specified (e.g., customer, user-defined, etc.) time intervals, such as, for example, 5 minutes or less.

Upon startup, a monitoring agent can access metadata stored in monitoring definition file to gain understanding and knowledge of distributed system topology and components that they are responsible to monitor. A monitoring definition file can contain information for agents to assess appliance health. For example, a monitoring definition file can define a mapping between physical hardware components to be monitored and logical system definition Health monitoring can be dynamically changed by changing monitoring definition files providing to modify/add which distributed system components will be monitored.

Upon monitoring agent configuration, a monitoring agent can collect raw information from underlying distributed system components. Monitoring agents can include built-in intelligence to reason over information collected and filter out information of interest. In addition, different events coming from distributed and independent components sometime can be correlated to identify system failures/warnings of interest. Correlation and reasoning can be completely transparent from end user and derived information is presented to end user as a single unit.

The ability to reason over, filter out, and correlate health information allows a health monitoring system to provide a level of abstraction. The abstraction allows end users to focus on components being monitored rather than possessing the knowledge of low level physical components, component manufacturers, and physical health statuses for each component. Due at least in part to the level of abstraction, an appliance can be re-implemented with different physical components without any impact to end users.

Figure 5:
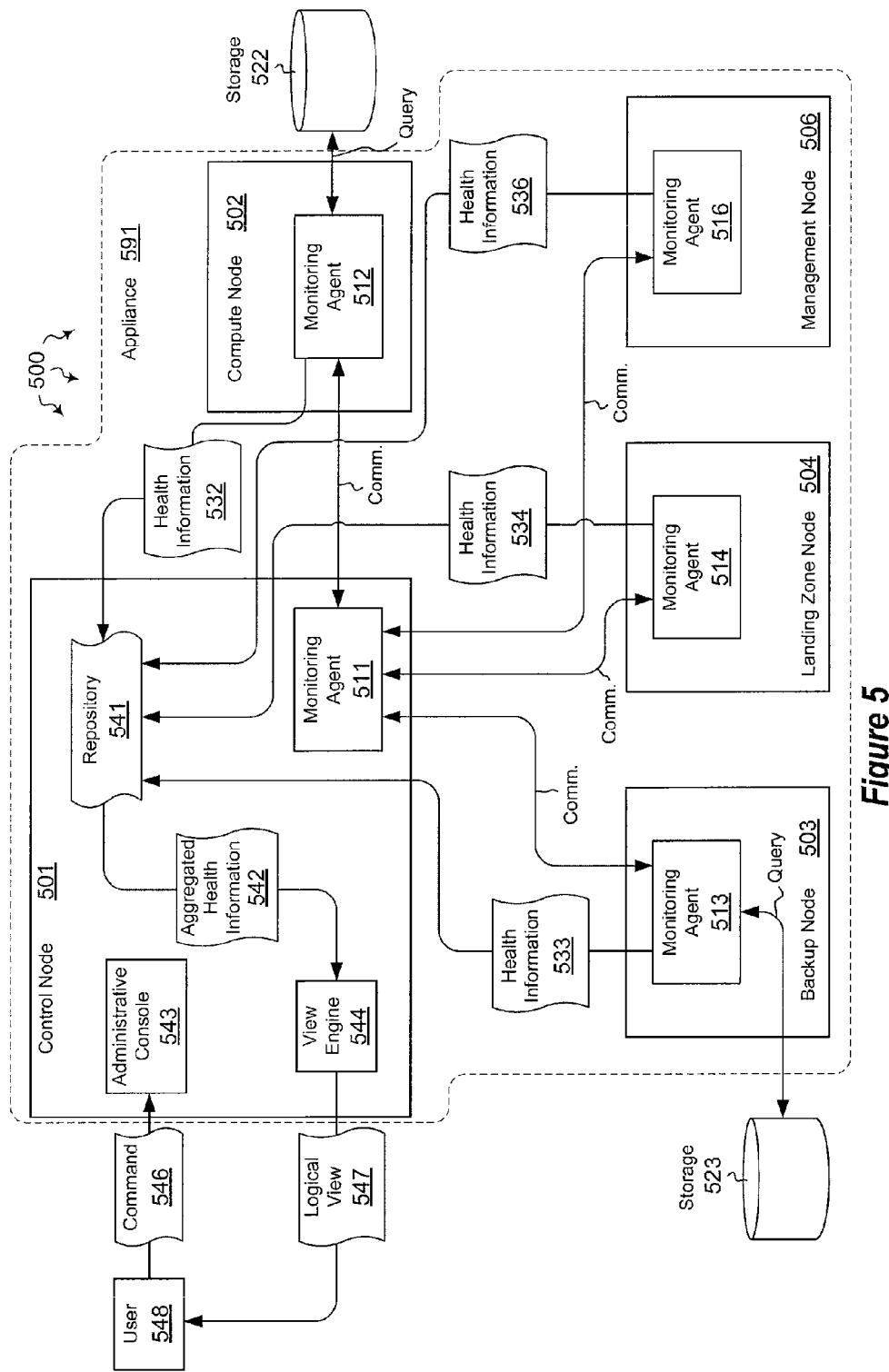
FIG. 5 illustrates another example computer architecture that facilitates configuring a computer system to monitor a portion of an appliance implemented at a distributed system.

FIG. 5 illustrates computer architecture 500 that facilitates monitoring an appliance implemented at a distributed system. As depicted, computer architecture 500 includes control node 501, compute node 502, backup node 503, landing zone node 501, and management node 506, which represent the functionality of appliance 591. Each node includes a monitoring agent configured in accordance with a monitoring definition file to monitor appliance components at the node. Control node 511 includes monitoring agent 511, computer node 502 includes monitoring agent 512, backup node 503 includes monitoring agent 513, landing zone node 504 includes monitoring agent 514, and management node 506 includes monitoring agent 516.

Generally, a monitoring agent can monitor hardware and/or software components (including external storage devices, such as, for example, storage 522 and 523) of a node the monitoring agent is configured to monitor. Monitoring agents can send monitoring health information to repository 541 for storage. For example, monitoring agents 512, 513, 514, and 516 can send health information 532, 533, 534, and 536 respectively for storage in repository 541. Control node 501 can received the health information and store the health information in repository 541.

In addition to monitoring components of node 501, monitoring agent 511 can monitor monitoring agents at other nodes, such as, for example, monitoring agents 512, 513, 514, and 516. Monitoring agent 511 can communicate with other monitoring agents using a heartbeat protocol to detect that the monitoring other agents are active. When another monitoring agent is detected as failing, monitoring agent 511 can attempt to restart the other monitoring agent.

From time to time, user 548 can issue commands to administrative console 543 to request the health status of appliance 591. For example, user 548 can send command 546 to administrative console 543. In response to command 546, view engine 544 can access aggregated health information 542. View engine 544 can reason over, filter out, and correlate aggregated health information 542 into logical view 547. View engine 544 can send logical view 547 to user 548. Logical view 548 can provide an overall view of appliance 591 that abstracts out health information related to lower level components and/or related to specified nodes.

Figure 6:
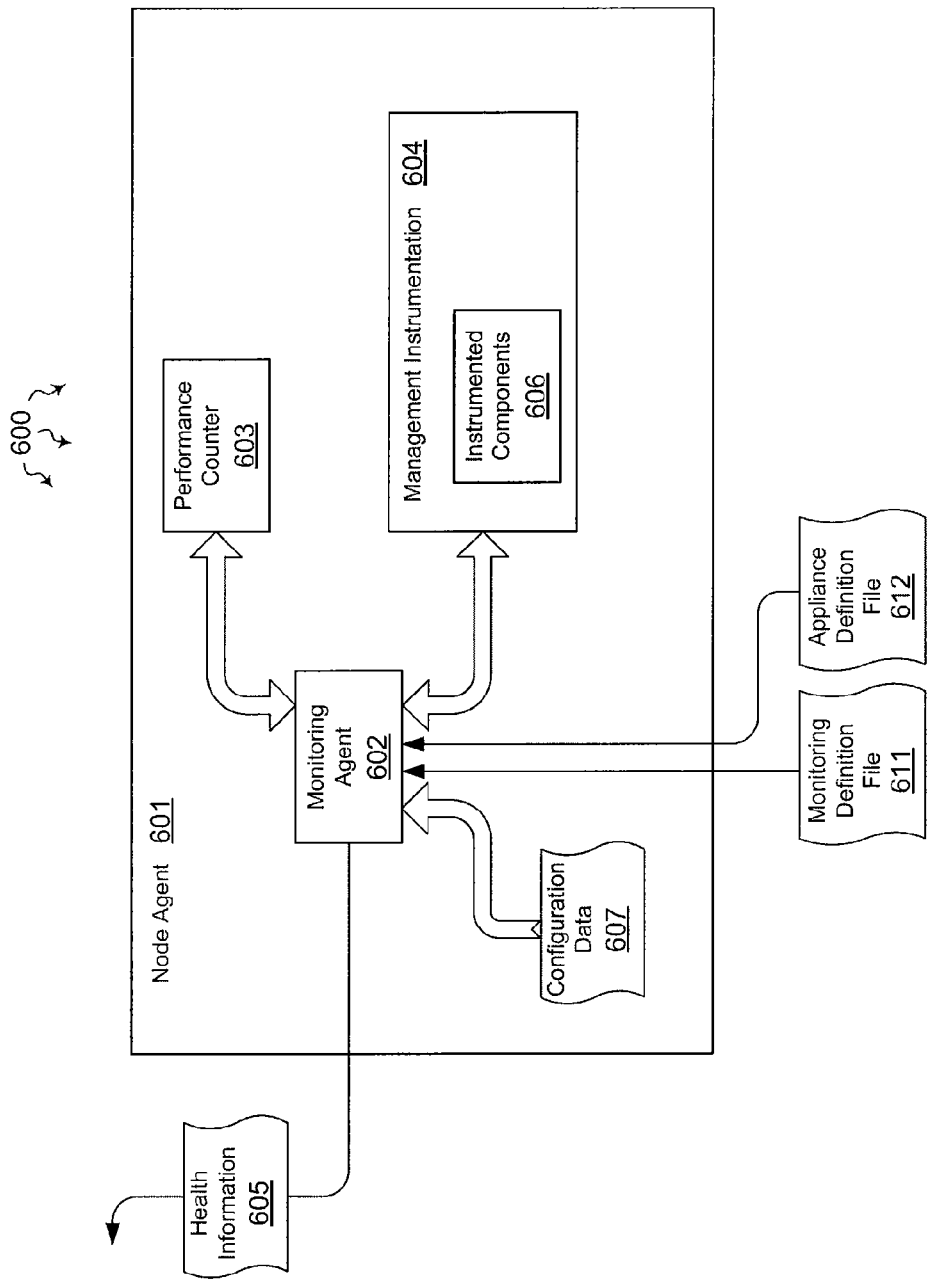
FIG. 6 illustrates another example computer architecture that facilitates monitoring an appliance implemented at a distributed system.

FIG. 6 illustrates computer architecture 600 that facilitates configuring a computer system to monitor a portion of an appliance implemented at a distributed system. As depicted, node 601 includes monitoring agent 602. Monitoring agent 602 can refer to application definition file 612 to identified hardware and/or software components used at node 601. Health definition file 611 can define how monitoring agent 602 is to be configured to monitor and collect health information for the identified hardware and/or software components used at node 601.

Monitoring agent 602 can refer to health definition file 611 and configure monitoring and collection of health information in accordance with definitions in health definition file 611. For example, monitoring agent 602 can be configured to monitor performance counter 603 and configuration data 607 (e.g., DLLs, registry, etc). Monitoring agent 602 can also communicate with management instrumentation 604 (e.g., Windows Management Instrumentation ("WMI")) to monitor instrumented components 606. Monitoring agent 602 can send health information 605 to a repository.

Appliance definition files and monitoring definition files can use any number of different data formats to define how a node is to provide designated functionality or monitor node components respectively. In some embodiments, an appliance definition file and a monitoring definition file include eXtensible Markup Language ("XML") instructions that define how to provide designated functionality and monitor node components respectively.

For example, an appliance definition file for an appliance can be of the format:

```
<!--Section 1-->
<?xml version="1.0" encoding="utf-8" ?>
- <Appliance xmlns:xsi="http://www.w3.org/2001/XMLSchema-instance"
xmlns:xsd="http://www.w3.org/2001/XMLSchema"
xmlns="http://www.microsoft.com/sql/DataWarehouse/Setup/Configuration/2009/09">
- <Topology Id="Example Topology 101" Selected="true" IpPrefix="172.16.0.0"
NumberOfNumaNodes="8" NumaNodesPerCore="1" ApplianceName="vdwpu"
MaxServerThreads="1792">
<!--Section 2-->
- <Cluster Id="DWManagementNodes" NodesPerCluster="2"
NodeTemplate="DwMgmtReplicaNodes-Dell.xml" Description="PDW Replication
Management Servers" Type="Management>"
    <Node NetBiosName="vdwpu-mad01" Private="172.16.0.250"
Private0="172.16.1.250" Application="172.16.128.250"
Application0="172.16.129.250" ExternalIp="10.10.10.250" PxeBootMac=""
IsPassive="false" NodeState="" IsLocal="true" EnterpriseNic="Broadcom
BCM5709C NetXtreme II GigE (NDIS VBD Client) #3" PrivateNic="Broadcom
BCM5709C NetXtreme II GigE (NDIS VBD Client) #2"
ApplicationNic="Mellanox IPoIB Adapter #2"
InternalSubnetMask="255.255.128.0" ExternalSubnetMask="255.255.255.0"
ExternalGateway="10.10.10.1" />
    <Node NetBiosName="vdwpu-mad02" Private="172.16.0.251"
Private0="172.16.1.251" Application="172.16.128.251"
Application0="172.16.129.251" ExternalIp="10.10.10.251" PxeBootMac=""
IsPassive="false" NodeState="" IsLocal="false"
InternalSubnetMask="255.255.128.0" ExternalSubnetMask="255.255.255.0"
ExternalGateway="10.10.10.1" />
  </Cluster>
  <!--Section 3-->
- <Cluster Id="DWControlNodes" Index="1" Name="vdwpu-WFOCTL01"
IpAddress="172.16.131.240" NodesPerCluster="2"
NodeTemplate="DwControlNodes-Dell.xml" Description="" Type="Control"
NumberOfTempDbDisks="3" NumberOfDisks="1" NumberOfLogs="1"
NumberOfQuorumDisks="1">
    <Node NetBiosName="vdwpu-ctl01" Private="172.16.0.240"
Private0="172.16.1.240" Application="172.16.128.240"
Application0="172.16.129.240" ExternalIp="10.10.10.240"
VirtualExternalIp="10.192.62.166" PxeBootMac="" IsPassive="false"
Instance="SQLCTL01" VirtualIp="172.16.130.240" DriveLetter="G"
NodeState="" InternalSubnetMask="255.255.128.0"
ExternalSubnetMask="255.255.255.0" ExternalGateway="10.10.10.1" />
    <Node NetBiosName="vdwpu-ctl02" Private="172.16.0.241"
Private0="172.16.1.241" Application="172.16.128.241"
Application0="172.16.129.241" ExternalIp="10.10.10.241" PxeBootMac=""
```

-continued

```xml
IsPassive="true" NodeState="" InternalSubnetMask="255.255.128. 0"
ExternalSubnetMask="255.255.255.0" ExternalGateway="10.10.10.1" />
    </Cluster>
<!--Section 4-->
- <Cluster Id="DWComputeNodes" Index="1" Name="vdwpu-WFOCMP01"
IpAddress="172.16.131.1" NodesPerCluster="5"
NodeTemplate="DwComputeNodes-Dell.xml" Description="" Type="Compute"
NumberOfTempDbDisks="2" NumberOfDisks="1" NumberOfLogs="1"
NumberOfQuorumDisks="0">
    <Node NetBiosName="vdwpu-cmp01" Private="172.16.0.1"
Private0="172.16.1.1" Application="172.16.128.1" Application0="172.16.129.1"
PxeBootMac="" IsPassive="false" Instance="SQLCMP01"
VirtualIp="172.16.130.1" DriveLetter="G" NodeState="" />
    <Node NetBiosName="vdwpu-cmp02" Private="172.16.0.2"
Private0="172.16.1.2" Application="172.16.128.2" Application0="172.16.129.2"
PxeBootMac="" IsPassive="false" Instance="SQLCMP02"
VirtualIp="172.16.130.2" DriveLetter="H" NodeState="" />
    <Node NetBiosName="vdwpu-cmp03" Private="172.16.0.3"
Private0="172.16.1.3" Application="172.16.128.3" Application0="172.16.129.3"
PxeBootMac="" IsPassive="false" Instance="SQLCMP03"
VirtualIp="172.16.130.3" DriveLetter="I" NodeState="" />
    <Node NetBiosName="vdwpu-cmp04" Private="172.16.0.4"
Private0="172.16.1.4" Application="172.16.128.4" Application0="172.16.129.4"
PxeBootMac="" IsPassive="false" Instance="SQLCMP04"
VirtualIp="172.16.130.4" DriveLetter="J" NodeState="" />
    <Node NetBiosName="vdwpu-cmp05" Private="172.16.0.5"
Private0="172.16.1.5" Application="172.16.128.5" Application0="172.16.129.5"
PxeBootMac="" IsPassive="true" Instance="" NodeState="" />
    </Cluster>
<!--Section 5-->
- <Cluster Id="DWLandingZoneNodes" NodesPerCluster="1"
NodeTemplate="DwLandingzoneNodes-Dell.xml" Description=""
Type="LandingZone">
    <Node NetBiosName="vdwpu-lz01" Private="172.16.0.230"
Private0="172.16.1.230" Application="172.16.128.230"
Application0="172.16.129.230" ExternalIp="10.10.10.230" PxeBootMac=""
IsPassive="false" NodeState="" InternalSubnetMask="255.255.128.0"
ExternalSubnetMask="255.255.255.0" ExternalGateway="10.10.10.1" />
    </Cluster>
<!--Section 6-->
- <Cluster Id="DWBackupNodes" NodesPerCluster="1"
NodeTemplate="DwBackupNodes-Dell.xml" Description="" Type="Backup"
Selected="true">
    <Node NetBiosName="vdwpu-bu01" Private="172.16.0.220"
Private0="172.16.1.220" Application="172.16.128.220"
Application0="172.16.129.220" ExternalIp="10.10.10.220" PxeBootMac=""
IsPassive="false" DriveLetter="G" NodeState=""
InternalSubnetMask="255.255.128.0" ExternalSubnetMask="255.255.255.0"
ExternalGateway="10.10.10.1" />
    </Cluster>
<!--Section 7-->
    <SAN />
- <ConfigurationProperties>
    <Property Category="Dms" Name="WriterBufferPoolSize" Value="0" />
    </ConfigurationProperties>
- <DefaultDistributions DefaultPort="1433">
    <Dist Name="A" NumaPort="1500" />
    <Dist Name="B" NumaPort="1501" />
    <Dist Name="C" NumaPort="1502" />
    <Dist Name="D" NumaPort="1503" />
    <Dist Name="E" NumaPort="1504" />
    <Dist Name="F" NumaPort="1505" />
    <Dist Name="G" NumaPort="1506" />
    <Dist Name="H" NumaPort="1507" />
    </DefaultDistributions>
- <DefaultPrimaryFileGroup>
- <PrimaryFileGroup Name="PRIMARY" MinFileSize="3MB"
MaxFileSize="UNLIMITED" FileGrowth="10%" Type="0">
    <DataPath RootPath="[DRIVE_LETTER]:\primary" IsFromAlter="false" />
    </PrimaryFileGroup>
    </DefaultPrimaryFileGroup>
- <DefaultLogFileGroup>
- <LogFileGroup Name="LOG" MinFileSize="4MB"
MaxFileSize="UNLIMITED" FileGrowth="10%" Type="3">
    <DataPath RootPath="[DRIVE_LETTER]:\log_01\data" IsFromAlter="false" />
    </LogFileGroup>
    </DefaultLogFileGroup>
- <DefaultReplicatedFileGroups>
- <ReplicatedFileGroups Name="REPLICATED" MinFileSize="4MB"
```

```
MaxFileSize="UNLIMITED" FileGrowth="4MB" Type="2">
    <DataPath RootPath="[DRIVE_LETTER]:\data_01\data" IsFromAlter="false" />
    <DataPath RootPath="[DRIVE_LETTER]:\data_02\data" IsFromAlter="false" />
    <DataPath RootPath="[DRIVE_LETTER]:\data_03\data" IsFromAlter="false" />
    <DataPath RootPath="[DRIVE_LETTER]:\data_04\data" IsFromAlter="false" />
    <DataPath RootPath="[DRIVE_LETTER]:\data_05\data" IsFromAlter="false" />
    <DataPath RootPath="[DRIVE_LETTER]:\data_06\data" IsFromAlter="false" />
    <DataPath RootPath="[DRIVE_LETTER]:\data_07\data" IsFromAlter="false" />
    <DataPath RootPath="[DRIVE_LETTER]:\data_08\data" IsFromAlter="false" />
  </ReplicatedFileGroups>
</DefaultReplicatedFileGroups>
- <DefaultDistributedFileGroups>
- <DistributedFileGroups Name="DIST" DistributionName="A"
MinFileSize="4MB" MaxFileSize="UNLIMITED" FileGrowth="4MB"
Type="1">
    <DataPath RootPath="[DRIVE_LETTER]:\data_01\data" IsFromAlter="false" />
  </DistributedFileGroups>
- <DistributedFileGroups Name="DIST" DistributionName="B"
MinFileSize="4MB" MaxFileSize="UNLIMITED" FileGrowth="4MB"
Type="1">
    <DataPath RootPath="[DRIVE_LETTER]:\data_02\data" IsFromAlter="false" />
  </DistributedFileGroups>
- <DistributedFileGroups Name="DIST" DistributionName="C"
MinFileSize="4MB" MaxFileSize="UNLIMITED" FileGrowth="4MB"
Type="1">
    <DataPath RootPath="[DRIVE_LETTER]:\data_03\data" IsFromAlter="false" />
  </DistributedFileGroups>
- <DistributedFileGroups Name="DIST" DistributionName="D"
MinFileSize="4MB" MaxFileSize="UNLIMITED" FileGrowth="4MB"
Type="1">
    <DataPath RootPath="[drive_LETTER]:\data_04\data" IsFromAlter="false" />
  </DistributedFileGroups>
- <DistributedFileGroups Name="DIST" DistributionName="E"
MinFileSize="4MB" MaxFileSize="UNLIMITED" FileGrowth="4MB"
Type="1">
    <DataPath RootPath="[DRIVE_LETTER]:\data_05\data" IsFromAlter="false" />
  </DistributedFileGroups>
- <DistributedFileGroups Name="DIST" DistributionName="F"
MinFileSize="4MB" MaxFileSize="UNLIMITED" FileGrowth="4MB"
Type="1">
    <DataPath RootPath="[DRIVE_LETTER]:\data_06\data" IsFromAlter="false" />
  </DistributedFileGroups>
- <DistributedFileGroups Name="DIST" DistributionName="G"
MinFileSize="4MB" MaxFileSize="UNLIMITED" FileGrowth="4MB"
Type="1">
    <DataPath RootPath="[DRIVE_LETTER]:\date_07\data" IsFromAlter="false" />
  </DistributedFileGroups>
- <DistributedFileGroups Name="DIST" DistributionName="H"
MinFileSize="4MB" MaxFileSize="UNLIMITED" FileGrowth="4MB"
Type="1">
    <DataPath RootPath="[DRIVE_LETTER]:\data_08\data" IsFromAlter="false" />
  </DistributedFileGroups>
</DefaultDistributedFileGroups>
</Topology>
</Appliance>
```

Section 1 of the example appliance definition indicates schema information as well as topology and appliance name. Section 2 of the example appliance definition defines two management nodes for the appliance. Section 3 of the example appliance definition defines two control nodes for the appliance. Section 4 of the example appliance definition defines five compute nodes for the appliance. Section 5 of the example appliance definition defines one landing zone node for the appliance. Section 6 of the example appliance definition defines one backup node for the appliance. Section 7 of the example appliance definition file defines storage and file groups for the appliance. It should be understand A monitoring definition file can include a plurality of different sections defining how different aspects of a node, such as, for example, network, internal storage, software, cluster, etc. are to be monitored. An example monitoring definition file for the appliance can be of the format:

```
<Appliance>
    <Node Id="199000000">
        <Component Id="199060000" Name="Network">
<!--Section 1-->
            <Device Id="199060300" Name="Adapter"
                    Namespace="root\cimv2"
                    PhysicalId="SELECT * FROM Win32_NetworkAdapter WHERE
PhysicalAdapter = TRUE">
                <Status Id="199060399" PhysicalId="Availability">
                    <Mapping Status="Unknown" Value="1"/>
                    <Mapping Status="Unknown" Value="2"/>
```

```
            <Mapping Status="Ok" Value="3"/>
            <Mapping Status="NonCritical" Value="4"/>
            <Mapping Status="Unknown" Value="5"/>
            <Mapping Status="Unknown" Value="6"/>
            <Mapping Status="Critical" Value="7"/>
            <Mapping Status="Critical" Value="8"/>
            <Mapping Status="Critical" Value="9"/>
            <Mapping Status="NonCritical" Value="10"/>
            <Mapping Status="Unknown" Value="11"/>
            <Mapping Status="NonRecoverable" Value="12"/>
            <Mapping Status="Unknown" Value="13"/>
            <Mapping Status="Unknown" Value="14"/>
            <Mapping Status="Unknown" Value="15"/>
            <Mapping Status="Unknown" Value="16"/>
            <Mapping Status="Unknown" Value="17"/>
        </Status>
        <DeviceData Id="199060301" Name="adapter_device_name"
PhysicalId="Name" IsKey="false"/>
        <DeviceData Id="199060302" Name="adapter_device_id"
PhysicalId="DeviceID" IsKey="true"/>
        <DeviceData Id="199060303" Name="adapter_device_status"
PhysicalId="Availability" IsKey="false"/>
        <DeviceData Id="199060305" Name"adapter_mac_address"
PhysicalId="MACAddress" IsKey="false"/>
        <DeviceData Id="199060306" Name="adapter_card_manufacturer"
PhysicalId="Manufacturer" IsKey="false"/>
        <DeviceData Id="199060307" Name="adapter_enabled"
PhysicalId="NetEnabled" IsKey="false"/>
        <DeviceData Id="199060308" Name="adapter_type"
PhysicalId="AdapterType" IsKey="false"/>
        <Alert Id="500229" Name="Network adapter has NORMAL status."
            Description="The network adapter is online and running normally
(vendor status: 3).
Vendor status is reported in the component's "adapter_device_status"
property."
            Type="StatusChange" State="Operational" Severity="Informational"
Status="Ok"/>
        <Alert Id="500230" Name="Network adapter has NON-CRITICAL status."
            Description="The network adapter is indicating there is a non-critical
warning but is still operational (vendor status: 4), potentially degrading
performance though (vendor status: 10).
Vendor status is reported in the component's "adapter_device_status"
property.
Review the node's Windows event log for details or contact device manufacturer."
            Type="StatusChange" State="Degraded" Severity="Warning"
Status="NonCritical"/>
        <Alert Id="500231" Name="Network adapter has NON-RECOVERABLE
status."
            Description="The network adapter is in non-recoverable status due to
potentially being installed in error (vendor status: 12).
Vendor status is reported in the component's "adapter_device_status"
property.
Review the node's Windows event log for details or contact device manufacturer."
            Type="StatusChange" State="Failed" Severity="Error"
Status="NonRecoverable"/>
        <Alert Id="500232" Name="Network adapter has CRITICAL status."
            Description="The network adapter is raising critical alert due to one of
the following reasons:
  - adapter is offline (vendor status: 8)
  - adapter has been powered off (vendor status: 7)
  - adapter is in off duty status (vendor status: 9)
Vendor status is reported in the component's "adapter_device_status"
property.
Review the node's Windows event log for details or contact device manufacturer."
            Type="StatusChange" State="Degraded" Severity="Error"
Status="Critical"/>
        <Alert Id="500233" Name="Network adapter has UNKNOWN status."
            Description="The status of the network adapter could not be determined.
This status could be caused due to one of the following reasons:
  - network adapter is in Power Save mode: standby (vendor status: 15), low power
(vendor status: 14), warning (vendor status: 17), unknown (vendor status: 13) or
power cycle (vendor status: 16)
  - network adapter has not been installed (vendor status: 11)
  - network adapter device reported unknown status (vendor status: 1 or 2)
  - network adapter might be in testing state (vendor status: 5)
Vendor status is reported in the component's "adapter_device_status"
property.
Review the node's Windows event log for details or contact device manufacturer."
            Type="StatusChange" State="Degraded" Severity="Warning"
```

```
Status="Unknown"/>
        </Device>
<!--Section 2-->
        <Device Id="199060400" Name="Connectivity"
                Namespace="root\cimv2"
                PhysicalId="SELECT * FROM Win32_NetworkAdapter WHERE
NetConnectionID = 'Enterprise'
                OR NetConnectionID = 'Private'
                OR NetConnectionID = 'Private0'
                OR NetConnectionID = 'Application'
                OR NetConnectionID = 'Application0'">
            <Status Id="199060499" PhysicalId="NetConnectionStatus">
                <Mapping Status="Critical" Value="0"/>
                <Mapping Status="NonCritical" Value="1"/>
                <Mapping Status="Ok" Value="2"/>
                <Mapping Status="NonCritical" Value="3"/>
                <Mapping Status="Critical" Value="4"/>
                <Mapping Status="Critical" Value="5"/>
                <Mapping Status="Critical" Value="6"/>
                <Mapping Status="Critical" Value="7"/>
                <Mapping Status="NonCritical" Value="8"/>
                <Mapping Status="Critical" Value="10"/>
                <Mapping Status="Critical" Value="11"/>
                <Mapping Status="Critical" Value="12"/>
            </Status>
            <DeviceData Id="199060401" Name="connectivity_device_name"
PhysicalId="Name" IsKey="false"/>
            <DeviceData Id="199060402" Name="connectivity_device_id"
PhysicalId="DeviceID" IsKey="true"/>
            <DeviceData Id="199060403" Name="connectivity_error_code"
PhysicalId="ConfigManagerErrorCode" IsKey="false"/>
            <DeviceData Id="199060404" Name="connectivity_connection_status"
PhysicalId="NetConnectionStatus" IsKey="false"/>
            <DeviceData Id="199060405" Name="connectivity_adapter_type"
PhysicalId="AdapterType" IsKey="false"/>
                <Alert Id="500234" Name="Network connection has NORMAL status."
                    Description="The network is connected and working correctly (vendor
status: 2).
Vendor status is reported in the component's
"connectivity_connection_status" property."
                    Type="StatusChange" State="Operational" Severity="Informational"
Status="Ok"/>
                <Alert Id="500235" Name="Network connection has NON-CRITICAL
status."
                    Description="The network is reporting a non critical state. This status
could be due to one of the following reasons:
  - network is in connecting state (vendor status: 1)
  - network is disconnecting state (vendor status: 3)
  - network authentication is in process (vendor status: 8)
Vendor status is reported in the component's
"connectivity_connection_status" property.
Review the node's Windows event log for details or contact device manufacturer."
                    Type="StatusChange" State="Degraded" Severity="Warning"
Status="NonCritical"/>
                <Alert Id="500236" Name="Network connection has CRITICAL status."
                    Description="The network connectivity is raising critical alert due to one
of the following reasons:
  - network is disconnected (vendor status: 0)
  - hardware is not present (vendor status: 4)
  - hardware has been disabled (vendor status: 5)
  - media is disconnected (vendor status: 7)
  - authentication has failed (vendor status: 10)
  - invalid address was used (vendor status: 11)
  - credential is required but not supplied (vendor status: 12)
Vendor status is reported in the component's
"connectivity_connection_status" property.
Review the node's Windows event log for details or contact device manufacturer."
                    Type="StatusChange" State="Degraded" Severity="Error"
Status="Critical"/>
        </Device>
    </Component>
.
.
.
{definitions for other components, for example, software, cluster, internal storage,
etc}
.
.
.
</Appliance>
```

The expressly depicted portion of the monitoring definition file defines mentoring behavior for monitoring network functionality of a node. Defining monitoring can include defining mappings, device data, alerts, etc. For the expressly depicted portion, mappings, device data, and alerts are defined for adapter (section 1) and connectivity (section 2).

Accordingly, embodiments of the invention provide distributed, self-maintained, continuous health monitoring. Using XML and pluggable infrastructure, a logical view of an appliance can be provided. The logical view abstracts physical implementation details of the appliance. Monitoring agents can correlate different distributed system failures and events and reason over collected health information.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer hardware storage device storing computer-executable instructions which, when executed by at least one hardware processor, implement a method for configuring a computer system to monitor a portion of an appliance implemented at a distributed system that includes a plurality of different computer systems, the method comprising:
   an act of accessing an appliance definition file;
   an act of selecting a type of node, from among a plurality of different types of nodes with functionality defined by the appliance definition file;
   an act of implementing the selected node type at the computer system in accordance with the defined functionality;
   an act of reading a health file that identifies components that are to be monitored for the selected node type;
   an act of loading a monitor agent to monitor the identified components;
   an act collecting health information indicating the health of the identified components; and
   an act of transferring the collected health information to a repository, wherein the collected health information is aggregated for identified components within the plurality of computer systems so as to represent a logical health view of the appliance, the logical health view abstracted from the identified components within the plurality of computer systems.

2. The computer storage device as recited in claim 1, wherein the appliance definition file defines one or more of: a control node type, a management node type, a computer node type, a landing zone node type, and a backup node type.

3. The computer storage device as recited in claim 2, wherein the method further includes an act of reading hardware and software definitions defining hardware and software that are to be used to implement functionality for the selected node type.

4. The computer storage device as recited in claim 3, wherein the act of implementing the selected node type at the computer system in accordance with the defined functionality comprises an act of implementing the selected node type using the defined hardware and software.

5. The computer storage device as recited in claim 1, wherein an act of reading a health file that identifies components that are to be monitored for the selected node type comprises an act of reading a health file that identifies one or more of: network resources, cluster resources, and storage resources that are to be monitored for the selected node type.

6. The computer storage device as recited in claim 1, wherein the method further includes an act of loading a monitor agent at the computer system to monitor the identified components, the identified components including one or more of: network resources, cluster resources, and storage resources.

7. The computer storage device as recited in claim 1, wherein the act collecting health information indicating the health of the identified components comprises an act of collecting status information for one or more of: network resources, cluster resources, and storage resources.

8. The computer storage device as recited in claim 1, wherein the act of transferring the collected health information to a repository comprises an act of transferring the collected health information to a repository under the control of a control node.

9. A hardware computer storage device storing computer-executable instructions which, when executed by at least one hardware processor, implement a method for configuring a computer system to monitor a portion of an appliance implemented at a distributed system that includes a plurality of different computer systems, the method comprising:
   an act of reading a portion of an appliance definition file defining functionality for a control node, the appliance definition file defining a plurality of different types of nodes, including the control node, functionality of the plurality of different types of nodes being integrated together to implement the appliance;
   an act of implementing the control node in accordance with the defined functionality;
   an act of receiving collected health information from monitoring agents that are loaded on at least one computer system for monitoring a plurality of other nodes in the distributed system, wherein the collected health information is collected in accordance with health files that identify specified components that are to be monitored at each of the plurality of other nodes;
   wherein the collected health information is transferred to and aggregated into a repository;
   formulating a logical health view for the appliance based on the aggregated health information in the repository, the logical health view abstracting the physical implementation of the appliance; and
   correlating collected health information from the aggregated health information of at least two different nodes to generate a condition of interest with respect to operation of the appliance.

10. The computer storage device as recited in claim 9, further comprising using a heartbeat protocol to monitor the status monitoring agents at one or more other nodes.

11. The computer storage device as recited in claim 9, wherein the act of reading a portion of an appliance definition file comprises an act of reading a portion of an eXstensible Markup Language ("XML") appliance definition file.

12. The computer storage device as recited in claim 9, wherein the act of receiving collected health information from monitoring agents at a plurality of other nodes in the distributed system comprises an act of receiving health information from one or more of: a management node, a compute node, a landing zone node, and a backup node.

13. The computer storage device as recited in claim 9, wherein the act of receiving collected health information from monitoring agents at a plurality of other nodes in the distributed system comprises an act of receiving status information for hardware and software resources being used to implement appliance functionality at the plurality of other nodes.

14. The computer storage device as recited in claim 13, wherein an act of formulating a logical health view for the appliance comprises formulating a logical health for the appliance that abstracts status information for individual hardware and software resources.

15. A hardware computer storage device storing computer-executable instructions which, when executed by at least one hardware processor, implement a method for configuring a computer system to implement a control node for an appliance implemented at a distributed system that includes a plurality of different computer systems, the method comprising:
 an act of accessing an appliance definition file, the appliance definition file defining a plurality of different node types including a control node type, a management node type, a computer node type, a landing zone type, and a backup node type, functionality of the plurality of different node types to be integrated together to implement the appliance;
 an act of selecting a control node type to be implemented at the computer system from the appliance definition file;
 an act of implementing the control node type at the computer system in accordance with the defined functionality;
 an act of reading a health file that identifies components that are to be monitored for the control node type;
 an act of using a monitor agent that is loaded at the computer system to monitor the identified components, including an act receiving collected health information indicating the health of identified components at other nodes in the distributed system;
 an act of accessing the received health information which is aggregated into a repository; and
 an act of using the aggregated health information in the repository to formulate a logical health view for the appliance, the logical health view abstracting the physical implementation of the appliance, and using the aggregated health information to generate a condition of interest with respect to operation of the appliance.

16. The computer storage device as recited in claim 15 wherein an act of accessing an appliance definition file comprises an act of accessing an eXstensible Markup Language ("XML") appliance definition file.

17. The computer storage device as recited in claim 15, wherein the method further includes reading hardware and software definitions defining hardware and software that are to be used to implement functionality for the control node type.

18. The computer storage device as recited in claim 15, wherein the act receiving collected health information indicating the health of identified components at the other nodes comprises an act of receiving health information from at least one a management node, at least one a compute node, at least one landing zone node, and at least one backup node.

19. The computer storage device as recited in claim 18, wherein the act receiving collected health information indicating the health of identified components at the other nodes comprises an act of receiving status information for hardware and software resources being used to implement appliance functionality.

20. The computer storage device as recited in claim 15, wherein the act of using the aggregated health information in the repository to formulate a logical health view for the appliance comprises formulating a logical health for the appliance that abstracts status information for individual hardware and software resources used at the other nodes.

* * * * *